United States Patent [19]

Meyerle et al.

[11] 4,056,696
[45] Nov. 1, 1977

[54] FLAT PANEL TELEPHONE STATION SET

[75] Inventors: John Alfons Meyerle, Manasquan; Rembert Ryan Stokes, Middletown, both of N.J.

[73] Assignee: Bell Telephone Laboratories, Incorporated, Murray Hill, N.J.

[21] Appl. No.: 723,230

[22] Filed: Sept. 15, 1976

[51] Int. Cl.² ............................................. H04M 1/02
[52] U.S. Cl. ..................... 179/100 R; 179/1 VE; 179/146 R; 179/179
[58] Field of Search ............... 179/1 VE, 29, 41 A, 179/100 R, 100 C, 146 R, 149, 178, 179, 147; 325/16, 111, 117

[56] References Cited

U.S. PATENT DOCUMENTS

| | | | |
|---|---|---|---|
| 1,809,125 | 6/1931 | Hoyt | 179/100 R |
| 2,487,016 | 11/1949 | Bescherer | 179/146 R |
| 2,495,006 | 1/1950 | Holmes | 179/146 R |
| 3,305,284 | 2/1967 | Dusterhoft | 179/146 R |
| 3,344,236 | 9/1967 | Chipping | 179/100 R |
| 3,546,396 | 12/1970 | Marcheschi et al. | 179/100 R |
| 3,824,465 | 7/1974 | Blough | 325/111 |
| 3,953,688 | 4/1976 | Rocha | 179/147 |

FOREIGN PATENT DOCUMENTS

| | | | |
|---|---|---|---|
| 2,053,038 | 5/1972 | Germany | 179/146 R |
| 671,885 | 7/1962 | Italy | 179/1 VE |

*Primary Examiner*—William C. Cooper
*Assistant Examiner*—Randall P. Myers
*Attorney, Agent, or Firm*—Charles Scott Phelan

[57] ABSTRACT

Subscriber-interface elements of a telephone station set are combined in and on a swivel panel. In one embodiment which is useful in automobile radiotelephone applications, the panel is a sun visor and includes arrangements to hold the handset in place even when the panel is upside down and to draw the handset up against the panel if the handset should be dropped during or after a call. Control buttons are arranged on the panel close to the user and, in the automobile embodiment, on a portion of the panel which is closest to the driver's line of vision. A cable connecting various station set elements to a control processor and radio extends through a swivel axle for the panel for convenient access to automobile body passageways from the visor to other locations of the automobile.

15 Claims, 10 Drawing Figures ion set, or control unit, are mounted in or on a swivel mounted panel. Such panels are useful for example in automobiles and in residential and office furniture. However, the description herein is presented, without intending any limitation on the scope of the invention, in the automobile environment wherein the subscriber needs and the prior art problems have been most acute.

FLAT PANEL TELEPHONE STATION SET

CROSS-REFERENCES TO RELATED APPLICATIONS

Concurrently filed with this application there is a design patent application Ser. No. D723,221, filed Sept. 15, 1976 of D. M. Genaro et al. entitled "Design for Telephone Set Base."

In addition there is a previously filed design application of D. M. Genaro et al. entitled "Design for a Telephone Station Handset," Ser. No. D718,852, filed Aug. 30, 1976.

BACKGROUND OF THE INVENTION

1. Field of the Invention

This invention relates to telephone control units, or subscriber station sets, and it relates particularly to such units for radiotelephone systems.

2. Prior Art

Telephone station sets are known in the art in many forms including relatively flat, box-type configurations which are freestanding at the end of a wire to be placed in a convenient location chosen by the subscriber. Such locations are known in the art to include, for example, concealed locations such as the inside of a drawer or a closet.

In mobile radiotelephone systems the control unit for a mobile radio unit contains the station set elements required for interfacing the radiotelephone with a subscriber. Such elements are often located in one spot in a vehicle and coupled by a cable to a control processor and radio mounted in other parts of the vehicle. Locating a control unit for a person in the driver's seat of an automobile is often a problem. The control unit is usually located on the dashboard, on the floor, or on a console between front seat passengers in the vehicle. It has also been proposed to mount the control unit on the ceiling of an automobile. However, space within an automobile is always at a premium and there is a growing need to identify out-of-the-way locations for the control unit to reduce the chances that a passenger will by accident strike the unit. As mobile radiotelephone service becomes more widely used, there is also a growing need for a standarized type of location for the control unit which is relatively free of the vagaries of automobile model variations. In addition to all of the foregoing problems, the design must, of course, keep the control unit in a location which is convenient for use by a person in the driver's seat in order to minimize distraction from normal driving functions.

Various items have, in the past, been mounted on automobile visors. For example, mirrors have been so mounted as well as radio transmitters for the remote control of selected equipment external to the motor vehicle. However, these prior items lack many of the functions needed for subscriber use of mobile radiotelephone service. For example, there is no need to operate selected controls often requiring visual identification, nor is there a need to remove an item from the visor and which is still connected to the visor after removal. Thus, radiotelephone service has continued for many years with control units on the dashboard, on the floor, or on consoles.

SUMMARY OF THE INVENTION

The foregoing problems of the prior art are alleviated in an illustrative embodiment of the present invention in which the elements of a telephone station set, or control unit, are mounted in or on a swivel mounted panel. Such panels are useful for example in automobiles and in residential and office furniture. However, the description herein is presented, without intending any limitation on the scope of the invention, in the automobile environment wherein the subscriber needs and the prior art problems have been most acute.

In one embodiment of the invention the panel is an automobile sun visor. A telephone handset is removably secured in a recess in the visor where the handset is held even though the control unit is in or near an inverted attitude. A retraction mechanism is provided to pull the handset up against the visor if the handset should be dropped. Various controls for the radiotelephone unit are arrayed near an edge of the visor which is closest to the line of vision of a person in the driver's seat of the vehicle.

BRIEF DESCRIPTION OF THE DRAWINGS

Various features, objects, and advantages of the invention may be better understood from a consideration of the following detailed description in conjunction with the appended claims and the attached drawings in which:

DETAILED DESCRIPTION OF THE DRAWING

As previously indicated herein, the invention is described in the environment represented by an automobile sunshield visor although the invention is useful in other swivel panel applications. One type of mobile radiotelephone system in which the invention is useful is a cellular high capacity system such as that taught in the A. E. Joel, U.S. Pat. No. 3,663,762.

Figure 1:
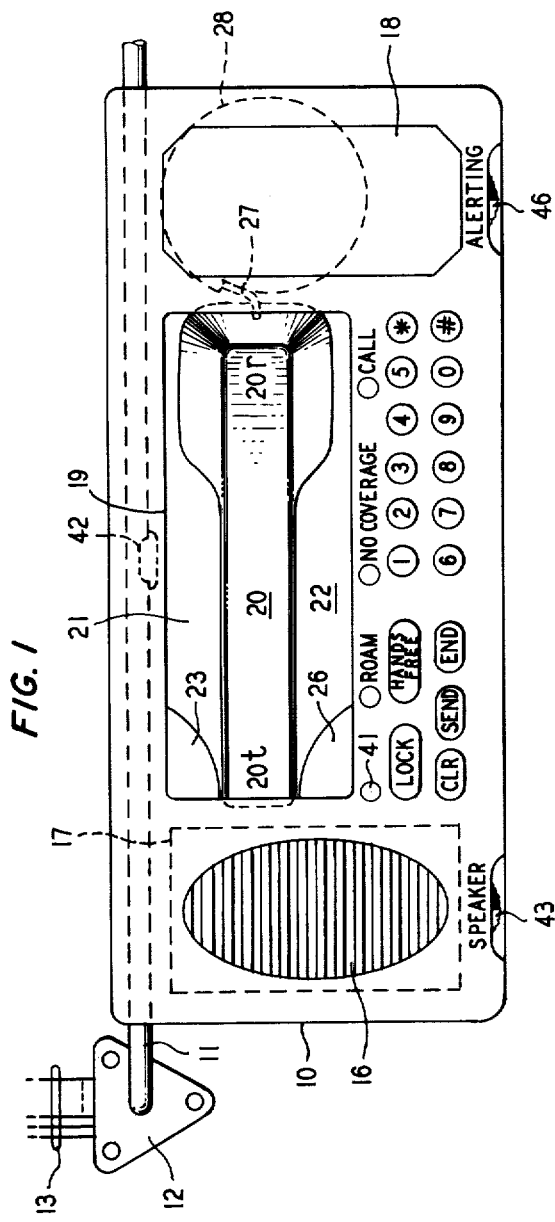
FIG. 1 is a first radiotelephone control unit embodiment of the present invention.

In FIG. 1 a visor 10 is swivel mounted for rotation about an axle 11 that is in turn swivel mounted on a bracket 12 for securing the visor to the body of an automobile (not otherwise shown). The usual point for securing such a visor and its bracket 12 is above the upper left-hand corner of the windshield of the automobile. A cable 13 contains various electric circuit conductors employed for connecting the telephone control unit to the remaining elements of the radiotelephone unit. This cable can be passed into an internal passageway of the automobile immediately beneath the bracket 12 or it can extend across the surface of the interior of the automobile to a different point of entry to such a passageway at the option of the installer. A further bracket (not shown) is also often provided in an automobile for providing removable support to the right-hand end of the visor axle 11 toward the center of the windshield.

A slotted or louvered opening 16 in the illustrated face of the visor 10 serves as a speaker grille or acoustic port for a loudspeaker 17 which is mounted within the visor. Also shown on the illustrated surface of the visor is a smooth panel 18 for the convenience of a subscriber for writing frequently used numbers. Alternatively, of course, the panel 18 could be replaced by a pocket for the insertion of a card upon which the same information can be retained.

Figure 2:
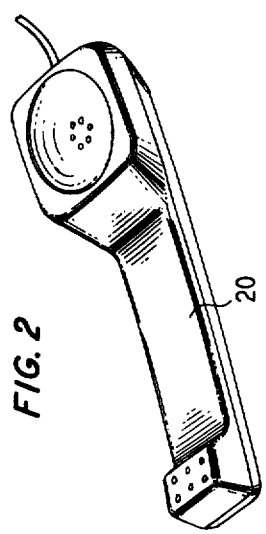
FIG. 2 is a perspective view of one type of handset useful in the embodiment of FIG. 1.

Advantageously located in a central portion of the visor 10 is a recess 19 for accommodating a handset 20. FIG. 2 is a perspective view of the handset 20 which includes an electret, or other small lightweight, microphone in the transmitter and thereof in order to reduce the size and weight of the handset as compared to those usually found in fixed subscriber stations. Such a microphone operates satisfactorily in the environment of an automobile which is sometimes noisy. In addition the electret and other small lightweight microphones operate sufficiently well so that the handset can be shorter and flatter than that which is usual for a fixed subscriber station.

The recess 19 in FIG. 1 includes on either side of the handset bridge portion adequate spaces 21 and 22 for providing convenient access to enable a subscriber to remove the handset from the recess 19. Thus, the space 21 at the top of the handset is adequate for entry of four fingers of the left hand of a subscriber while the space 22 is similarly adequate for the entry of four fingers of the right hand of a subscriber. The left-hand end of the recess 19 is narrowed to a reduced transverse dimension by wedge portions 23 and 26 which guide the transmitter end 20t of the handset into its rest position in the visor.

A cord 27 provides electrical connection from the handset 20 through a cord reel 28 to become part of the portion of cable 13 contained within the visor as will be subsequently described. The cord reel 28 is advantageously of a type known in the art which maintains tension on the cord 27 at all times even when the handset is in use by the subscriber. One such cord reel is the Western Electric Co. 5A cord reel. Tension on the cord 27 is advantageously set so that it will at all times exceed the weight of the handset and the cord 27 so that if the handset is dropped while it is in use, the retracting force exerted by cord reel 28 pulls the handset up against the visor 10, out of the way of the automobile driver, and out of the way of various automobile controls. The same retracting force, plus the fact that cord 27 is connected to the receiver end 20r of handset 20, tends to keep the cord above the line of vision of an automobile driver using the handset.

Figure 4:
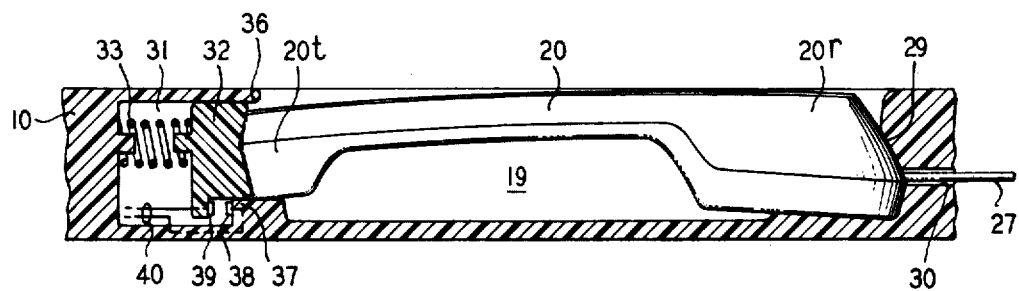
FIG. 4 is a cross-sectional view of a portion of the visor of FIG. 1 for illustrating one arrangement for securing the handset in the visor.

The handset 20 is removably secured in the recess 19 in such a way as to hold it in that recess in the absence of a removing force substantially in excess of the weight of the handset. This is to prevent the handset from falling out of position when the visor 10 is in any position other than that in which the visor is raised by turning on axle 11 so that the illustrated face is against the ceiling of the automobile. Different techniques are available for securing the handset in position as just mentioned. Some such techniques include, for example, providing a restraining strap or providing elastic cushioning around the transmitter end 20t and the receiver end 20r of the handset for frictionally engaging the handset. It is also known to provide magnetic walls for the recess 19 and the handset to supply by magnetic attraction the necessary retaining force. A positive latching arrangement is presently preferred and one form thereof is illustrated in the cross-sectional view of FIG. 4. There the recess 19 includes at the right-hand end thereof a concave end wall 29 contoured to receive the receiver end 20r of the handset 20. In addition the wall 29 is provided with an aperture 30 through which the cord 27 passes from the center of the end of the receiver end 20r to the cord reel 28 in FIG. 1. The aperture 30 is advantageously located as close as is conveniently possible to the axle 11 to minimize the turning moment exerted on the visor 10 by the cord 27 when the handset 20 is in use by a subscriber. At the left-hand end of the recess 19, there is an extension 31 of the recess beneath the surface of visor 10. Within that extension is located a spring loaded, movable member 32 which is urged toward the right by a spring 33 for engaging the transmitter end 20t of the handset 20.

To place the handset 20 in the recess 19, the subscriber pushes the transmitter end of the handset against the member 32 displacing that member to the left so that the transmitter end is beneath an overhanging portion 36 of the face of the visor 10. Then the receiving end 20r is placed in the right-hand end of the recess 19 and the handset is released. The handset is held in recess 19 under the combined forces of the tension on cord 27 and the urging to the right of the spring 33. In addition, the overhanging portion 36 and the upper end of the wall 29 in FIG. 4 also serve to retain the handset in position. In the extension 31 of the recess 19 there is provided a shoulder 37 for limiting the extent of movement to the right of the member 32. On the left face of that shoulder is a contact 38 which mates with a contact 39 secured to a lower extension of the member 32 for performing the switchhook function when the handset is removed from recess 19. Under those conditions the member 32 moves to the right thereby closing contacts 38, 39 for supplying an indication through the pair of wires 40 and cable 13 to indicate to the radiotelephone unit control processor that the subscriber is off hook.

Returning to FIG. 1, a 12-button pushbutton dial is provided with the pushbuttons arranged in two rows along the lower-most edge of visor 10 when the visor is in its lowered orientation as shown in the drawing. This places these buttons close to the line of vision of a person in the driver's seat of the automobile, and it also makes it relatively easy to operate the buttons accurately using the fingertips of one hand that is steadied by holding the thumb of the same hand along the lower edge of the visor 10. Several other control buttons are illustratively provided in the same two rows of buttons.

One of the additional control buttons is a LOCK button provided for actuating an electric lock for the radiotelephone unit as will be subsequently described. Another is a HANDS-FREE button for switching operation of the telephone from a mode dependent upon use of the handset 20 to a mode in which there are used the loudspeaker 17 and a separately mounted microphone (not shown). Such transfers between handset aned HANDS-FREE types of operation are known in the art. An additional CLEAR button permits the subscriber to signal the mobile control circuits (indicated in FIG. 8) and the processor therein, to erase information that had just been dialed from a dialed number register therein and without transmitting such number to a serving base station. A SEND button is provided for signaling the processor to cause the transmission of a number which had theretofore been dialed and stored in the processor's dialed number register (not shown). Finally an END button is used for signaling the processor that the call has ended.

Several lights are also provided on the visor 10 for the convenience of the subscriber. A LOCK light 41 located directly above the LOCK pushbutton is connected to be illuminated when the automobile ignition is on and the mobile radio unit is locked. A companion light 42 located on the opposite face of the visor from the face illustrated in FIG. 1 is included in the same circuit so that the subscriber will know the state of his radiotelephone unit even when the visor is raised to conceal the elements of the control unit by turning the visor so that the illustrated face is next to the ceiling of the automobile. A transmitter status light CALL is also provided, and it is lighted by the processor when the transmitter of the radiotelephone unit is energized. When an incoming call is detected, such a visual signal is usually actuated, and it is also usually accompanied by an audible alerting signal through the loudspeaker 17. A NO COVERAGE light is energized by the processor when its processing circuits fail to detect sufficient received energy from the radio receiver. This alerts the subscriber that he has moved his automible out of the service area of the radiotelephone system.

A pair of volume control thumb wheels 43 and 46 are provided along the lower edge of the visor 10, and each such wheel controls a variable resistor (56 and 57 in FIG. 8) within the visor 10 and included in respective circuits extending in cable 13 to the control processor. The resistor controlled by thumb wheel 46 controls the volume of signals to loudspeaker 17 in an alerting operation, and the resistor controlled by the thumb wheel 43 controls the volume of voice signals to loudspeaker 17. Each thumb wheel advantageously has different portions thereof of contrasting colors to aid the subscriber in recognizing his normal correct setting for each volume control.

Figure 3:
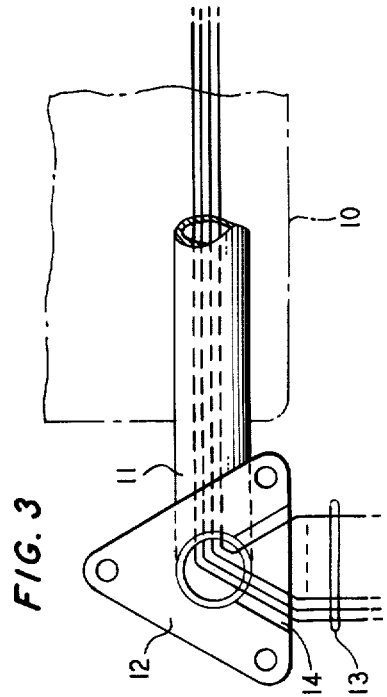
FIG. 3 is an enlarged view of the reverse side of the upper left corner of the embodiment of FIG. 1 to illustrate one manner for applying electrical connections to the radiotelephone unit of FIG. 1.

FIG. 3 shows the reverse side of bracket 12 and the reverse side of one corner of the visor 10 as seen by rotating the bracket and the visor 180° about an axis in the top edge of the bracket 12 in FIG. 1. It can be seen in FIG. 3 that the cable 13 is advantageously in a ribbon cable form for ease of insertion behind trim strips or upholstery in the automobile. Alternatively, with the use of an adhesive, the cable can be secured to the exterior of the trim strips. The conductors of the cable are, however, at the bracket 12 separated to allow them to be collected in a tapered notch 14 to form a more compact bundle for ease of passing the conductors through the hollow interior of the axle 11 to the inside of the visor 10. The separation of the conductors also allows the cable to have the flexibility to permit the visor 10 to rotate without damage to the cable. Detail of the swivel mechanism for the hollow axle 11 on the bracket 12 is not specifically shown, but such mechanisms are well known to allow the shifting of the visor to provide a sunshield effect either to the front or left side of the driver. In the latter position, of course, the telephone control unit can be used from the outside of the automobile. Also in that latter position, if the automobile is moving, wind action cannot readily sweep the handset out of recess 19 because it urges the receiver end 20r against the concave wall 29 in FIG. 4, and in that position the wall 29 holds the receiver end 20r and the overhang 36 holds the transmitter end 20t in the recess 19.

Figure 5B:
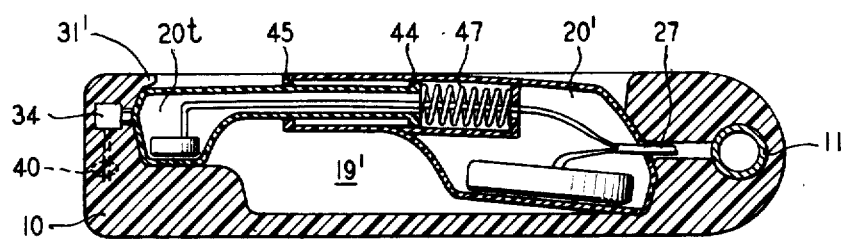
FIG. 5B is a cross-sectional view of a handset for use in the embodiment of FIG. 5A.
Figure 5A:
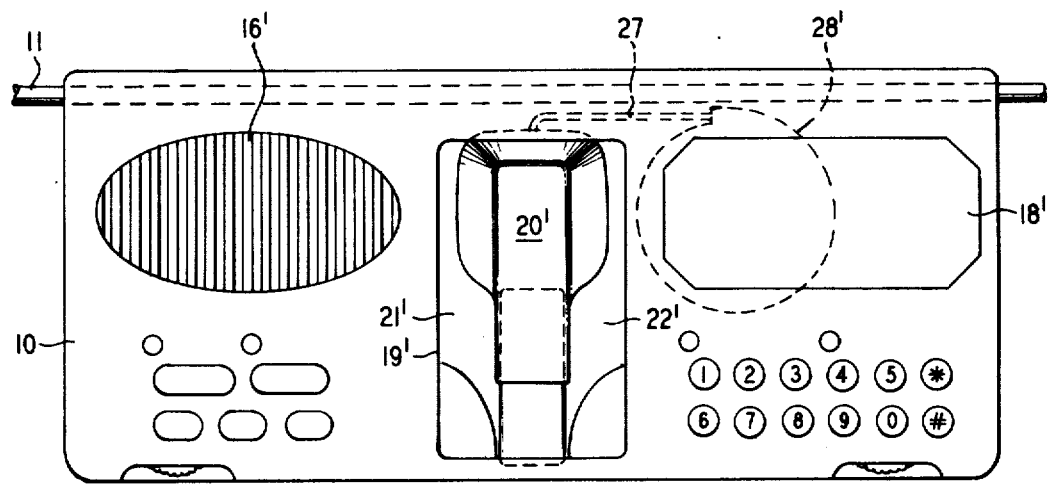
FIG. 5A is a modified form of the embodiment of FIG. 1.

FIG. 5A depicts a modified form of the visor-type radiotelephone control unit of FIG. 1. In FIG. 5A the same or similar reference characters are used for corresponding elements which perform the same functions in FIG. 1. The acoustic port oval 16' and the writing panel 18' are turned 90° in the face of the visor 10 and shifted toward the axle 11 so that the dial pushbuttons can be shifted to the right and the remaining control buttons shifted to the left. These changes allow the recess 19' to be rotated 90° thereby relocating the spaces 21' and 22' therein. This allows a subscriber to have access to the handset 20' by either a vertical right-handed or a vertical left-handed grip rather than the underhand right and overhand left grips required for the embodiment of FIG. 1. The FIG. 5A arrangement also permits the cord 27' to pass through the upper end of the recess 19' at a point which is closer to the axle 11 than in FIG. 1 for reduced turning moment on the visor 10 when the handset is in use.

Since the vertical dimension of the visor 10 in FIG. 5A will usually be less than the length of the handset illustrated in FIG. 2, a modified handset 20' is employed in FIG. 5A. The modified handset is illustrated in side section in FIG. 5B where the left edge of visor 10 corresponds to the lower edge of the visor as shown in FIG. 5A. Handset 20' includes a telescoping bridge portion which is spring loaded to snap open when the handset 20' is removed from recess 19'. That recess is similar to the recess 19 shown in FIG. 4 except that the elements 32 and 33 are omitted, extension 31 is correspondingly shortened, and overall recess 19' is shorter. A simplified illustration of the telescoping handset 20' and a portion of recess 19' are shown in FIG. 5B wherein a spring 47 urges the transmitter end 20t of the handset to the left toward a size similar to that indicated for the handset 20 in FIG. 4, but full extension in FIG. 5B is prevented by the end walls of recess 19'. A switch 34 has a pushbutton actuator that engages the transmitter end 20t of handset 20' in the position illustrated to perform the function of switchhook contacts 38, 39 in FIG. 4. To remove handset 20' the bridge portion and receiver end are removed to the left in FIG. 5B to compress further spring 47 and clear the right end of the recess. Then the receiver is pulled out, and spring 47 forces it to the fully extended position where further extension is stopped by engagement of outside rim shoulder 44 with an inside rim shoulder 45.

Figure 6:
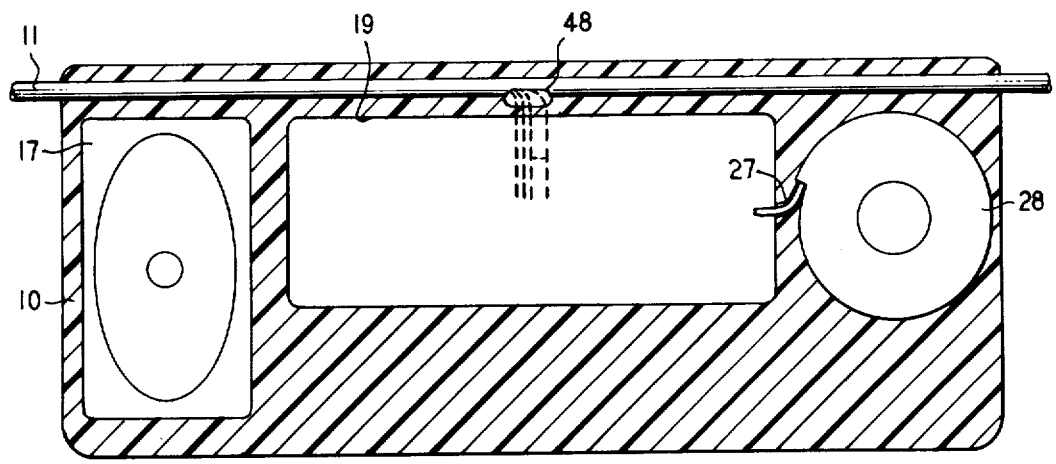
FIG. 6 is an illustration of the embodiment of FIG. 1 with the handset and the upper portion of the visor removed to illustrate an arrangement for elements contained within the visor.

FIG. 6 is a sectional view of the embodiment of FIG. 1 with the front face of the visor 10, the pushbuttons, and the lights removed to show the speaker 17 and the cord reel 28. Speaker 17 is advantageously a small model such as those commonly employed in speakerphone applications for fixed telephone stations. Also shown is a hole 48 in the wall of the hollow axle 11 through which the conductors of the cable 13 extended into the visor 10 to reach the loudspeaker 17, the cord reel 28, and the various buttons and lights hereinbefore described. The hole 48 extends around a sufficient part of the circumference of axle 11 to permit movement of the wires in cable 13 as the visor 10 is turned through its full range of rotation. In some applications axle 11 is actually made in two separate sections with inner ends spaced, in lieu of hole 48, to allow cable 13 to pass directly out of the right-hand end of the left-hand section.

It can also be seen in FIG. 6 that the region of the visor below the cord reel 28, and which is normally covered by the writing panel 18 of FIG. 1, could be utilized for additional equipment. For example, a small cassette tape recorder could be mounted there and electrically connected for communication with the subscriber by way of the handset 20 or loudspeaker 17 as controlled by the subscriber by way of additional pushbuttons not separately shown.

Figure 7:
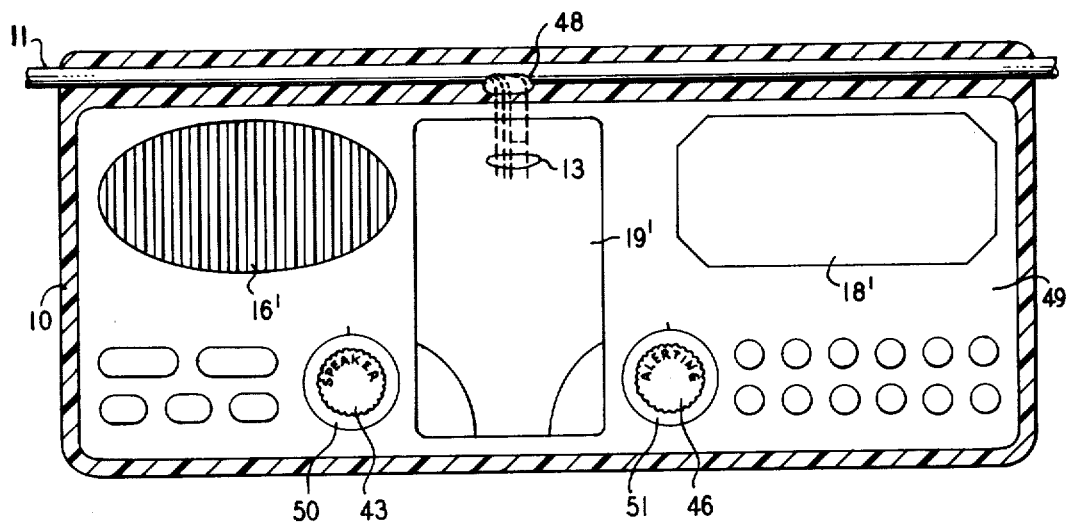
FIG. 7 is a further modification of the embodiment of FIG. 1.

FIG. 7 is a cross-sectional view of a modified form of the embodiment of FIG. 5. However, the features of the FIG. 7 embodiment are also useful in connection with the embodiment of FIG. 1. In FIG. 7 the elements of the control unit are mounted in and on a control unit module box 49 which fits into a cutaway portion of the visor 10. This arrangement permits visors to be made in any size or shape that is convenient for a particular model of an automobile but using a standard axle 11 and a standard cutaway portion of predetermined size to accommodate the box 49. Absent a radiotelephone control unit module, the cutaway can contain a covered box for storing maps, sunglasses, and the other items in a location which is convenient to the automobile driver. When radiotelephone service is to be provided, it is necessary simply to replace the covered box by the control unit module box 49 and run the cable 13 through the axle 11 as previously outlined. In this embodiment the thumb wheels 43 and 46 are still advantageously adjacent to the lower edge of the visor 10, but they are now located in respective circular depressions 50 and 51 in the top surface of the module box 49. In this embodiment lettering is included on the respective thumb wheels for indicating both the function and the relative volume level by comparing the lettering with an index mark at the edge of the depression.

Figure 8:
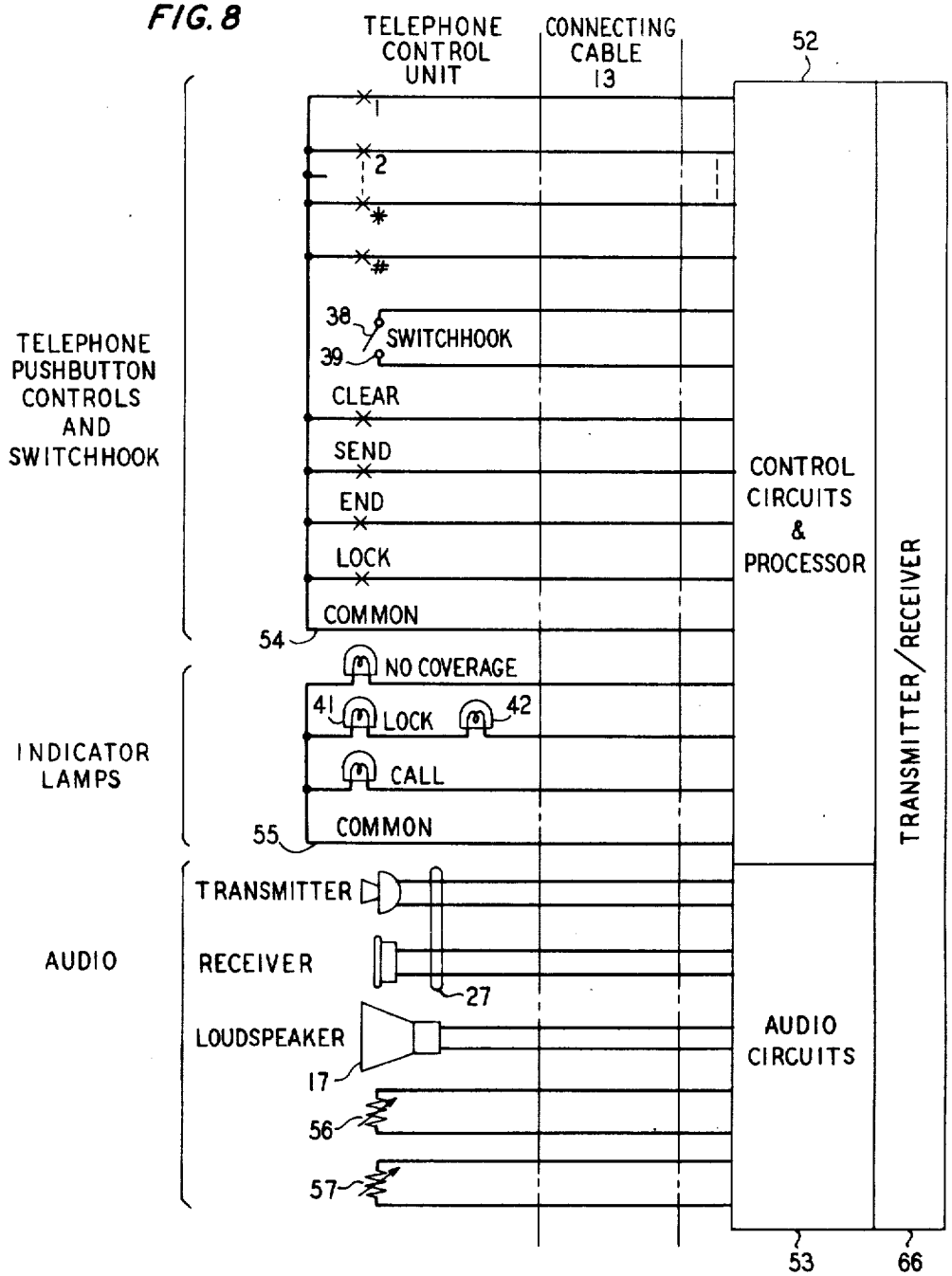
FIG. 8 is an electrical diagram of a radiotelephone unit in accordance with FIG. 1.

FIG. 8 is a circuit diagram showing one form of the control unit elements hereinbefore described and electrically through conductors of the cable 13 to control circuits 52, which include the aforementioned control processor, and to audio circuits 53 which couple the electro-acoustic transducers of the control unit to a radio transmitter/receiver 66. Circuits 53 perform such functions as volume control, companding, wave shaping, and band and level limiting. The circuits 52, 53, and 66 are advantageously located in some out-of-the-way section of the automobile such as in a portion of a luggage compartment. The electrical functions of all of the control unit elements are individually known in the art and can be performed in various ways suited to particular requirements for the extent of complexity to be included on the visor 10 or in the circuits 52 and 53. In the present state of the art, the major circuit complexity is advantageously included in the circuits 52 and 53 as is now well known in the art. However, future developments can make it advantageous to shift many functions into the control unit and thereby the extent of wiring between the control units and the circuits 52 and 53.

For purposes of simplicity of illustration, FIG. 8 shows a single wire per pushbutton and a make contact, indicated by an X mark on the wire, operable by the pushbutton to connect the wire to a common lead 54 extending back to a common connection in the control circuits 52. This wiring can, of course, be simplified by providing a pushbutton dialing pad of a type now known in the art which includes logic for outputting from the pad a four-digit, binary coded decimal, bit-parallel code identifying which button is actuated. Similarly, each of the indicator lights previously mentioned is included in an individual conductor in cable 13 and all share a common return lead 55. Two variable resistors 56 and 57 controlled respectively by thumb wheels 43 and 46 are also included in cable 13 wire pairs that extend to audio circuits 53. Likewise the transmitter and receiver transducers of handset 20 are connected in separate two-wire circuits included in the cable 27 which is coupled through the cord reel 28 (not shown in FIG. 8) and the cable 13 to audio circuits 53. The loudspeaker 17 is also similarly connected by a two-wire circuit through the cable 13 to audio circuits 53. Switchhook contacts 38, 39 are also connected by a two-wire circuit through cable 13 to the control circuits 52.

Since in the present state of the art unauthorized use of mobile radiotelephone units is usually discouraged by a mechanical key lock which controls an electric circuit, a brief discussion is in order of the use of electrical locking in the present invention. Pushbutton electrical locks of various types for various items of automobile equipment are known in the art but have not heretofore been used in connection with radiotelephone equipment. It is contemplated in the present invention that the processor in control circuits 52 is programmed to recognize a predetermined combination of, e.g., three simultaneously or sequentially actuated pushbuttons in the pushbutton dial and in response thereto to energize the transmitter/receiver circuits of the radiotelephone unit. Correspondingly, the processor is advantageously programmed to recognize actuation of the lock button for de-energizing the transmitter/receiver to prevent unauthorized use thereof.

Figure 9:
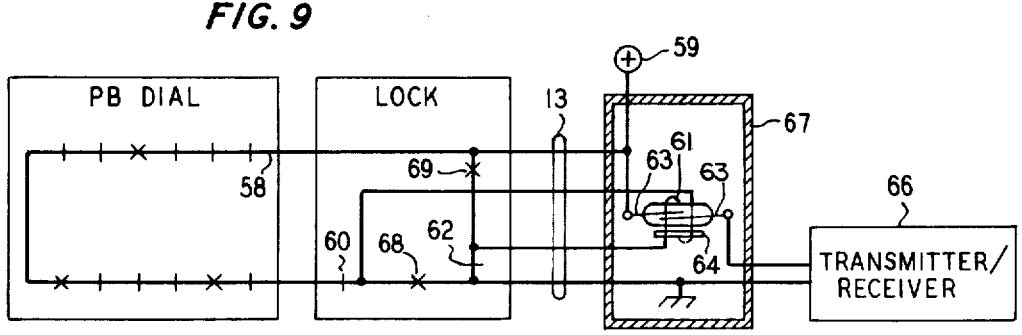
FIG. 9 is a schematic diagram for an electric locking arrangement that is useful in the embodiment of FIG. 8.

FIG. 9 illustrates an alternative electric locking arrangement requiring less processor intervention than was hereinbefore outlined. In accordance with the embodiment of FIG. 9, the buttons of the pushbutton dial are provided with extra contacts, some of which are normally closed, or break, contacts as indicated by short, vertical lines across a wire 58 extending through the pushbutton dial. The remaining pushbutton contacts, three in FIG. 9, are normally open, or make, contacts. Those three normally open contacts must be simultaneously actuated, with no other pushbuttons of the dial being actuated at the same time, in order to close an electric circuit path from a positive source 59 through the LOCK button, the wire 58 of the pushbutton dial, break contact 60 of the LOCK button, a coil 61, and break contact 62 of the LOCK pushbutton, to a common connection in the control circuits 52. The resulting energization of the coil 61 aids a magnet 64 to close a pair of magnetically latching reed switch contacts 63 for energizing the transmitter/receiver 66 of the mobile radiotelephone unit from the source 59. Magnetic latching holds the contacts 63, 63 closed after release of the normally open dial pushbuttons. A magnetically shielded housing 67 protects the switch contacts 63, 63 from unauthorized external operation, e.g., by a manually-wielded magnet. Transmitter/receiver 66 is subsequently de-energized by actuating the LOCK pushbutton and thereby opening contacts 60 and 62. In addition, make contacts 68 and 69 are thereby closed for re-energizing the coil 61 from the source 59, but with the opposite direction of current flow. This re-energization of coil 61 opens the contacts 63, 63 and thereby de-energizes, i.e., locks, transmitter/receiver 66. No current is required to maintain the locked state after the LOCK button is released and contacts 68 and 69 reopen.

Although the present invention has been described in connection with particular applications, modifications, and embodiments thereof, it is to be understood that additional modifications, applications, and embodiments which will be apparent to those skilled in the art are included within the spirit and scope of the invention.

We claim:

1. A telephone station set adapted to be operated by a user in at least one predetermined position, said set comprising
   a rotatable panel member having first and second oppositely disposed faces and mounted for rotation between a first position wherein the first face is substantially concealed from view from said user position and a second position wherein the first face is in full view from said user position, said panel member having a recess in said first face for receiving a handset,
   a handset having transmitter and receiver portions shaped to fit in said recess substantially entirely within the thickness of said panel member between said first and second faces, said handset comprising
      a bridge portion mechanically connecting said transmitter and receiver portions, and
      said bridge portion includes first and second longitudinal sections, one telescopically engaging the other, and means for resiliently urging said sections apart from a telescopically closed position toward a telescopically extended position,
   said recess is of a length to accommodate said handset in said closed position,
   means for retaining said handset in said recess in the absence of a removing force substantially in excess of the weight of said handset, and
   means, mounted on said panel, for performing push-button dialing operations.

2. A telephone station set adapted to be operated by a user in at least one predetermined position, said set comprising
   an automobile sunshield visor including a rotatable panel member having first and second oppositely disposed faces and mounted for rotation between a first position wherein the first face is substantially concealed from view from said user position and a second position wherein the first face is in full view from said user position, said panel member having a recess in said first face for receiving a handset,
   said first face is that which faces the automobile roof when the visor is in its raised position,
   a handset having transmitter and receiver portions shaped to fit in said recess substantially entirely within the thickness of said panel member between said first and second faces,
   means for retaining said handset in said recess in the absence of a removing force substantially in excess of the weight of said handset, and
   means, mounted on said panel, for performing push-button dialing operations.

3. A telephone station set in accordance with claim 2 in which
   said handset comprises
      a bridge portion mechanically connecting said transmitter and receiver portions, and
      said bridge portion includes first and second longitudinal sections, one telescopically engaging the other, and means for resiliently urging said sections apart from a telescopically closed position toward a telescopically extended position,
   said recess is of a length to accommodate said handset in said closed position,
   means are provided for supporting said panel member for rotation about an axis adjacent to one edge thereof, and
   said recess has an oblong configuration and extends substantially perpendicularly to said axis.

4. The telephone station set in accordance with claim 2 in which there are provided
   means for mounting said panel member for rotation about an axis adjacent to an edge thereof, and
   said dialing means includes an oblong array of pushbuttons extending parallel to the axis of rotation between said first and second positions and adjacent to an edge of said first face that is rmote from said axis.

5. A telephone station set in accordance with claim 2 in which
   an electric circuit cord is provided for connecting said transmitter and receiver portions electrically to a communication system,
   means are provided within said panel member and adjacent to said recess for retracting said cord to said panel member, said retracting means applying to said cord a retracting force substantially in excess of the weight of said handset and said cord,
   means for mounting said panel member for rotation about an axis adjacent to an edge thereof,
   said recess includes in one end thereof a cord port through which said cord extends to said handset, said port being adjacent to said axis of rotation between said first and second positions to minimize the turning moment on said panel when said handset is removed from said recess,
   said cord is attached to said handset at said receiver portion there, and 6. A telephone station set in accordance with claim 2 in which
   said panel member includes a cutaway portion and
   means are provided for containing elements of said station set other than said panel and including at least said handset, said recess, said retaining means, and said dialing means, said containing means being shaped to fit in said cutaway portion.

7. A telephone station set in accordance with claim 2 in which
   an electric circuit cord is provided for connecting said transmitter and receiver portions electrically to a communication system, and
   means are provided within said panel member and adjacent to said recess for retracting said cord to said panel member, said retracting means applying to said cord a retracting force substantially in excess of the weight of said handset and said cord.

8. A telephone station set in accordance with claim 7 in which there are provided
   means for mounting said panel member for rotation about an axis adjacent to an edge thereof, and
   said recess includes in one end thereof a cord port through which said cord extends to said handset, said port being adjacent to said axis of rotation between said first and second positions to minimize the turning moment on said panel when said handset is removed from said recess.

9. A telephone station set in accordance with claim 7 in which said cord is attached to said handset at said receiver portion thereof.

10. A telephone station set in accordance with claim 2 in which one end of said recess includes an aperture with a spring-loaded movable member for engaging said transmitter portion and urging said handset toward the opposite end of said recess, and said opposite end of said recess is provided with a concave end wall for receiving said receiver portion of said handset under urging of said movable member.

11. A telephone station set in accordance with claim 10 in which sides of said recess adjacent to said one end thereof are tapered toward said movable member for guiding said transmitter portion during insertion of said handset into said recess.

12. A telephone station set adapted to be operated by a user in at least one predetermined position, said set comprising a rotatable panel member having first and second oppositely disposed faces and mounted for rotation between a first position wherein the first face is substantially concealed from view from said user position and a second position wherein the first face is in full view from said user positon, said panel member having a recess in said first face for receiving a handset, a handset having transmitter and receiver portions shaped to fit in said recess substantially entirely within the thickness of said panel member between said first and second faces, means for retaining said handset in said recess in the absence of a removing force substantially in excess of the weight of said handset, means, mounted on said panel, for performing pushbutton dialing operations, a multiconductor ribbon cable for extending electrical connections from said handset and dialing means, the conductors of said cable being secured adjacent to one another in a side-by-side relationship to form an approximately straight-line cable transverse cross section, an axle secured to said panel member to provide an axis for said rotation, said axle being hollow in at least a portion of the length thereof from an edge of said panel member to an intermediate region of such member to form a cable conduit, and said ribbon cable having the conductors thereof separated from one another and formed into an approximately circular transverse cross-sectional bundle in a portion thereof extending through said conduit to said handset and said dialing means.

13. A telephone station set adapted to be operated by a user in at least one predetermined position, said set comprising a rotatable panel member having first and second oppositely disposed faces and mounted for rotation between a first position wherein the first face is substantially concealed from view from said user position and a second position wherein the first face is in full view from said user position, said panel member having a recess in said first face for receiving a handset, a handset having transmitter and receiver portions shaped to fit in said recess substantially entirely within the thickness of said panel between said first and second faces, means for retaining said handset in said recess in the absence of a removing force substantially in excess of the weight of said handset, means, mounted on said panel, for performing pushbutton dialing operations, a radiotelephone transmitter/receiver unit, and means on said panel operable for electrically locking said transceiver unit, said locking means including visual indicating means to indicate whether or not the unit is locked.

14. A telephone station set in accordance with claim 13 in which there are provided an energizing circuit for said unit and including latching switch means controllable for enabling said energizing circuit, means responsive to actuation of only predetermined ones of the pushbuttons of said pushbutton dialing means for actuating said latching switch means and thereby energizing said unit, and means for electrically disabling said latching switch means.

15. A telephone station set in accordance with claim 13 in which said indicating means includes a first light visible in said first face and a second light visible in said second face.

* * * * *